(12) United States Patent
Zwicker et al.

(10) Patent No.: US 6,580,425 B1
(45) Date of Patent: Jun. 17, 2003

(54) HIERARCHICAL DATA STRUCTURES FOR SURFACE ELEMENTS

(75) Inventors: Matthias B. Zwicker, Gerlikon (CH); Hanspeter Pfister, Somerville, MA (US); Markus H. Gross, Uster (CH)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/514,543

(22) Filed: Feb. 28, 2000

(51) Int. Cl.$^7$ ............................................. G06T 17/00
(52) U.S. Cl. ..................................................... 345/420
(58) Field of Search ................................. 345/418, 419, 345/420, 421, 423, 424

(56) References Cited

U.S. PATENT DOCUMENTS 6,111,582 A * 8/2000 Jenkins ........................ 345/421

OTHER PUBLICATIONS

Chang et al.; "LDI Tree: A Hierarchical Representation for Image–Based Rendering"; Computer Graphics Proceedings, Annual Conference Series, SIGGRAPH 99, Aug. 1999, pp. 291–297.

* cited by examiner

*Primary Examiner*—Cliff N. Vo
(74) *Attorney, Agent, or Firm*—Dirk Brinkman

(57) ABSTRACT

In a method for representing a graphic object, rays are cast through the object. The rays originate at orthogonal planes surrounding the object. The surface of the object is sampled for shape and shade attributes at points where the rays intersect the surface. The sampled shape and shade attributes of each sampled point are stored in an octree stored in the memory.

18 Claims, 13 Drawing Sheets

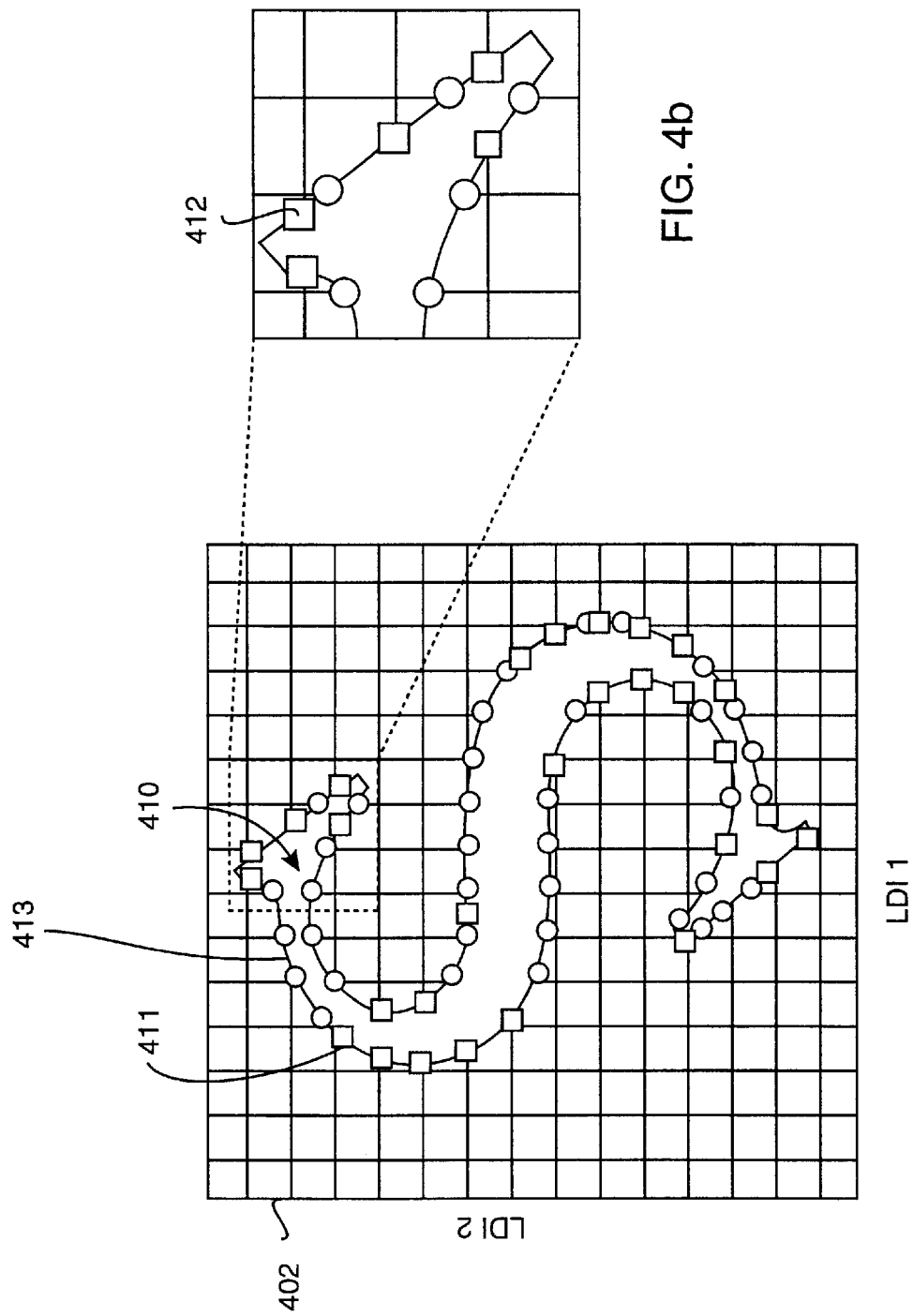

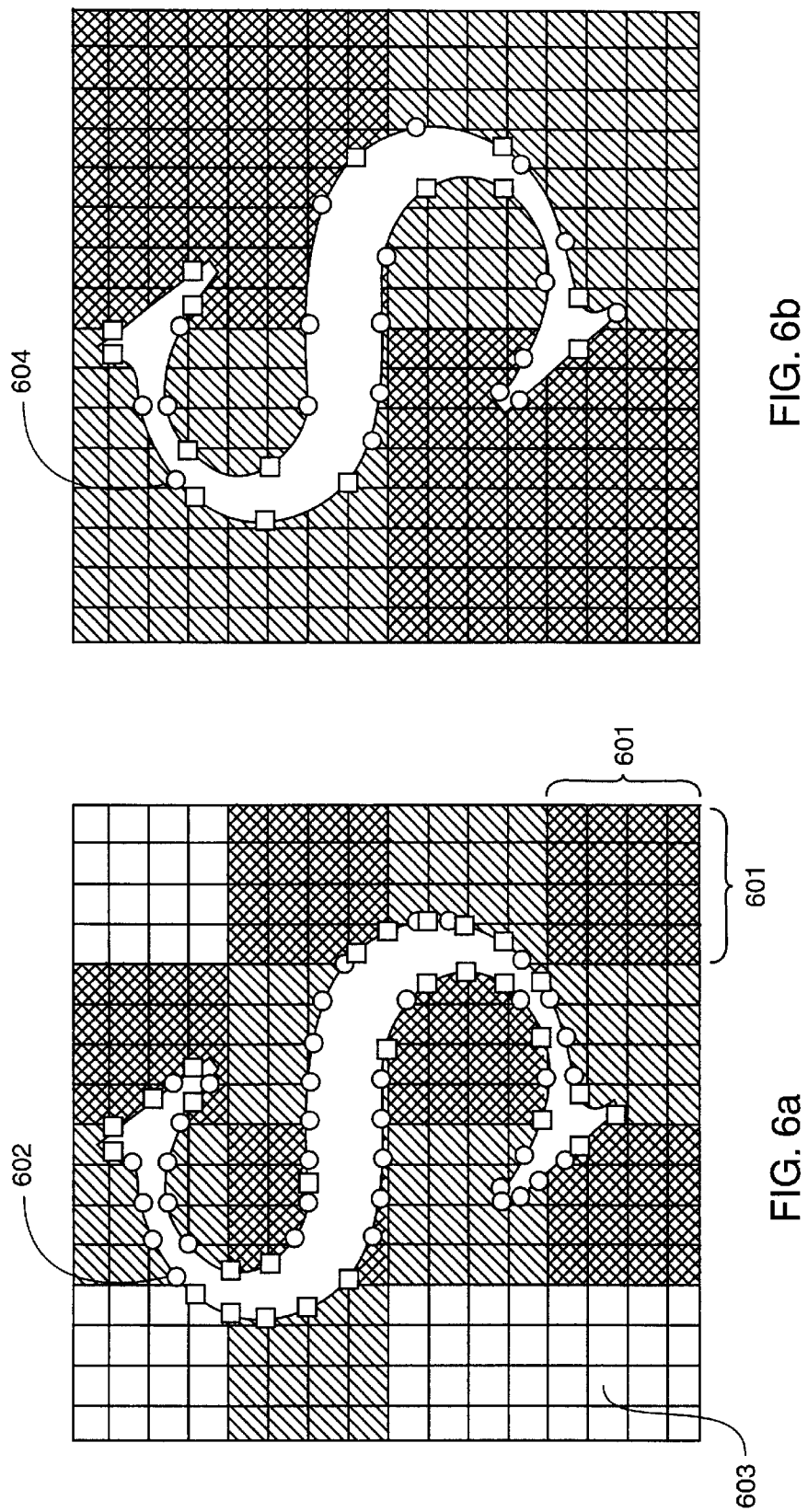

HIERARCHICAL DATA STRUCTURES FOR SURFACE ELEMENTS

FIELD OF THE INVENTION

This invention relates generally to graphic rendering, and more particularly to representing graphic objects using hierarchical data structures and surface elements.

Introduction to Computer Graphics

Three-dimensional computer graphics have become ubiquitous at the consumer level. There is a proliferation of affordable 3D graphics hardware accelerators, from high-end PC workstations to low-priced game stations. However, interactive computer graphics have still not reached the level of realism that allows a true immersion into a virtual world. For example, typical foreground characters in real-time games are extremely minimalistic polygon models that often exhibit annoying artifacts, such as angular silhouettes.

Various sophisticated modeling techniques, such as implicit surfaces, or subdivision surfaces, allow the creation of 3D graphics models with increasingly complex shapes. Higher order modeling primitives, however, are eventually decomposed into triangles before being rendered by the graphics subsystem. The triangle as a rendering primitive seems to meet the right balance between descriptive power and computational burden. To render realistic, organic-looking models requires highly complex shapes with ever more triangles, or, as stated by Smith in *"Smooth Operator,"* *The Economist,* pp. 73–74, Mar. 6, 1999, "reality is 80 million polygons."

Processing many small triangles leads to bandwidth bottlenecks and excessive floating point number calculations and rasterization requirements. To increase the apparent visual complexity of objects, texture mapping has been introduced. Textures convey more detail inside a polygon, thereby allowing larger and fewer triangles to be used. Today's graphics engines are highly tailored for high texture mapping performance. However, texture maps have to follow the underlying geometry of the polygon model and work best on flat or slightly curved surfaces. Realistic or "organic" surfaces frequently require a large number of textures that have to be applied in multiple passes during rasterization.

Advanced rendering techniques, such as Phong shading, bump mapping, and displacement mapping, are not handled by most current consumer graphics systems. Graphic phenomena such as smoke, fire, or water are difficult to render using textured triangles.

Graphical Representations

In computer graphics, one can represent objects in 3D space in many different ways using various primitive graphic elements. The known representations that are commonly used to represent graphic objects are implicit, geometric, volumetric, and point sample.

Implicit Representation

In an implicit representation, the graphic object can be generated from arbitrary mathematical and/or physical functions. For example, to draw the outline of a hollow sphere one simply supplies the rendering engine with the function (in Cartesian coordinates) $x^2+y^2+z^2=r$, and for a solid sphere the function is $x^2+y^2+z^2 \leq r$. Color and other material properties can similarly be synthetically generated. Functions can be used to describe various geometric shapes, physical objects, and real or imaginary models. Implicit functions are not suitable for synthezising complex objects, for example, a human figure.

Geometric Representation

Classically, 3D objects have been geometrically modeled as a mesh of polygonal facets. Usually, the polygons are triangles. The size of each facet is made to correspond mostly to the degree of curvature of the object in the region of the facet. Many polygons are needed where the object has a high degree of curvature, fewer for relatively flat regions. Polygon models are used in many applications, such as, virtual training environments, 3D modeling tools, and video games. As a characteristic, geometric representations only deal with the surface features of graphic objects.

However, problems arise when a polygon model is deformed because the size of the facets may no longer correspond to local degrees of curvature in the deformed object, after all, a triangle is flat. Additionally, deformation may change the relative resolution of local regions. In either case, it becomes necessary to re-mesh the object according to the deformed curvature. Because re-meshing (polygonization) is relatively expensive in terms of computational time, it is usually done as a preprocessing step. Consequently, polygon models are not well suited for objects that need to be deformed dynamically.

Volumetric Representation

In an alternative representation, the object is sampled in 3D space to generate a volumetric data set, for example, a MRI or CT scan. Each sample is called a voxel. A typical data set may include millions of voxels. To render a volumetric data set, the object is typically segmented. Iso-surfaces can be identified to focus on specific volumetric regions. For instance, a volumetric data set of the human head may segment the voxels according to material properties, such as bone and soft tissue.

Because of the large number of voxels, physically-based modeling and the deformation of volumetric data sets is still a very computationally expensive operation. Often, one is only interested in surface features, and the interior of the object can effectively be ignored.

Point Sample Representation

A point sample representation of objects is often used to model fluid flows, for example, in wind tunnel simulations. Certain attributes, such as orientation velocity, are given to point samples in order to track individual point samples through the fluid flow, or to visualize the complete flow.

Another application of point sample representation is in the visualization of "cloud-like" objects, such as smoke, dust or mist. A shading model can be applied to point samples that emit light to render cloud-like objects. Also, point samples can be constrained to subspaces with the help of energy functions to model surfaces. An advantage of point sample clouds is that the clouds are very deformable. As a disadvantage, the point samples in the cloud are unconnected and behave individually when exposed to forces. Furthermore, prior art point samples are quite unsuitable for representing surfaces of solid objects or models.

Rendering Considerations

The rendering time for these conventional primitives depends on the complexity of the objects modeled. For example, with a geometric representation of a complex object, the polygons are typically very small in size, in the order of a very small number of pixels, and the object is represented by many polygons. The polygons are usually represented with vertices that define a triangle.

To render a polygon, the projection of the triangle is scan-converted (rasterized) to calculate the intensity of each pixel that falls within the projection. This is a relatively time consuming operation when only a few pixels are covered by each polygon. Replacing the polygons with point samples and projecting the point samples to the image can be a more efficient technique to render objects.

A number of techniques are known for rendering volumes. In general, volume rendering is quite complex. Unless the number of voxels is limited, real-time rendering can be time consuming, or impractical for real-time applications.

Discrete Particles

A real-time rendering system, described in U.S. Pat. No. 5,781,194 "Real-time Projection of Voxel-based Objects," issued to Ponomarov et al. on Jul. 14, 1998, constructs a chain of surface voxels using incremental vectors between surface voxels. That representation succeeds in modeling and displaying objects showing highly detailed surface regions. The modeling of rigid body motion is done with the aid of scripting mechanisms that lack realism because physically-based methods are not used.

The use of points as rendering primitives has a long history in computer graphics. Catmull, in "A Subdivision Algorithm for Computer Display of Curved Surfaces," Ph.D. thesis, University of Utah, December 1974, observed that geometric subdivision may ultimately lead to points on surfaces. Particles were subsequently used for objects, such as clouds, explosions, and fire, that could not be rendered with other methods, see Reeves in "Particle Systems—A Technique for Modeling a Class of Fuzzy Objects, SIGGRAPH Proceedings, pp. 359–376. July 1983.

Visually complex objects have been represented by dynamically generated image sprites. Sprites are fast to draw and largely retain the visual characteristics of the object, see Shade et al. in "Layered Depth Images," SIGGRAPH Proceedings, pp. 231–242. July 1998. A similar approach was used in the Talisman rendering system to maintain high and approximately constant frame rates, see Torborg et al. in "Talisman: Commodity Real-Time 3D Graphics for the PC," SIGGRAPH Proceedings, pp. 353–364, August 1996. However, mapping objects onto planar polygons leads to visibility errors and does not allow for parallax and disocclusion effects. To address these problems, several methods add per-pixel depth information to images, variously called layered impostors, sprites with depth, or layered depth images, just to name a few. Still, none of these techniques provides a complete object model that can be illuminated and rendered from arbitrary points of view.

All these methods use view-dependent, image centered samples to represent an object or scene. However, view-dependent samples are ineffective for dynamic scenes with motion of objects, changes in material properties, and changes in position and intensities of light sources.

Levoy et al. in "The Use of Points as a Display Primitive," University of North Carolina Technical Report 85-022, 1985, describe a process for converting an object to a point representation. There, each point has a position and a color. They also describe a process to render the points as a smooth surface. The points are modeled as zero-dimensional samples, and are rendered using an object-order projection. When rendering, multiple points can project to the same pixel and the intensities of these points may need to be filtered to obtain a final intensity for the pixel under consideration. This filtering is done by weighting the intensity proportional to the distance from the projected point position in the image to the corresponding pixel-center, whereas the weights are normalized according to the partial coverage of a pixel by a surface. The coverage is estimated by calculating the density of the projected points in image space and the weighting is modeled with a Gaussian filter. An enhanced depth-buffer (z-buffer) allows for depth comparisons with a tolerance that enables the blending of points in a small region of depth-values. Their point representation allows one to render the object from any point of view.

In another technique, as described by Grossman et al. in "Point Sample Rendering," Proceedings of the Eurographics Workshop '98, Rendering Techniques 1998, pp. 181–192, July 1998, the point samples are obtained by sampling orthographic projections of an object on an equilateral triangle lattice. The equilateral triangle lattice was preferred to a quadrilateral one because the spacing between adjacent sampling points is more regular.

Dally et al., in "The Delta Tree: An Object-Centered Approach to Image-Based Rendering," Technical Report AIM-1604; MIT, May 1996, introduced the delta tree as an object-centered approach to image-based rendering. The movement of the viewpoint in their method, however, is still confined to particular locations.

Chang et al., in "LDI Tree: A Hierarchical Representation for Image-Based Rendering," SIGGRAPH Proceedings, pp. 291–298, August 1999, presented the LDI tree, a hierarchical space partitioning data structure for image based rendering.

All of the known representations have some limitations. Therefore, what is needed is an object representation that combines the best features of each and simplifies rendering.

SUMMARY OF THE INVENTION

The present invention provides a method for rendering objects with rich shapes and textures at interactive frame rates. The method is based on surface elements (surfels) as rendering primitives. Surfels are point samples of a graphics model. In a preprocessing stage, the surfaces of complex geometric models are sampled along three orthographic views. The invention adaptively samples the object using image space resolution. At the same time, computation-intensive calculations such as texture, bump, or displacement mapping are performed. By moving rasterization and texturing from the core rendering pipeline to the preprocessing step, the rendering cost is dramatically reduced.

From a rendering point of view, the surfel representation according to the invention provides a discretization of the geometry, and hence, reduces the object representation to the essentials needed for rendering. By contrast, triangle primitives implicitly store connectivity information, such as vertex valence or adjacency—data not necessarily available or needed for rendering.

Storing normals, prefiltered textures, and other per surfel data enables one to build high quality rendering processes. Shading and transformations is applied on a per surfel basis to achieve Phong illumination, bump and displacement mapping, as well as other advanced rendering features.

The rendering also provides environment mapping with a painterly surfel rendering process running at interactive frame rates. A hierarchical forward projection algorithm allows one to estimate the surfel density per output pixel for speed-quality tradeoffs.

A surfel rendering pipeline complements existing graphics pipelines. The pipeline trades memory overhead for rendering performance and quality. The present invention is suitable for interactive 3D applications, particularly for organic objects with high surface details, and for applications where preprocessing is not an issue. These qualities make the present invention ideal for interactive games.

Surfels according to the invention are a powerful paradigm to efficiently render complex geometric objects at interactive frame rates. Unlike classical surface discretizations, i.e., triangles or quadrilateral meshes, surfels are point primitives without explicit connectivity. Surfel attributes comprise depth, texture color, normal, and others. As a preprocess, an octree-based surfel representation of a geometric object is constructed. During sampling, surfel positions and normals are optionally perturbed, and different levels of texture colors are prefiltered and stored per surfel in a view independent manner.

During rendering, a hierarchical forward warping algorithm projects surfers to a z-buffer (depth buffer). A novel method called visibility splatting determines visible surfels and holes in the z-buffer. Visible surfels are shaded using texture filtering, Phong illumination, and environment mapping using per-surfel normals. Several methods of image reconstruction, including supersampling, offer flexible speed-quality tradeoffs. Due to the simplicity of the operations, the surfel rendering pipeline is amenable for a hardware implementation. Surfel objects offer complex shape, low rendering cost and high image quality, which makes them specifically suited for low-cost, real-time graphics, such as games.

More particularly, a rendering system includes a memory storing shape and shade attributes of a surface of the object. The attributes are arranged as an octree in the memory. The octree includes a plurality of nodes arranged at a plurality of levels, each node storing a plurality of zero-dimensional n-tuples, each n-tuple locally approximating the shape and shade attributes of a portion of the surface of the graphic object, and the n-tuples having a sampling resolution of an image space. A plurality of parallel processing pipelines are connected the memory. The pipelines project the shape and shade attributes of the octree to an image plane having a selected orientation by traversing the n-tuples of the nodes of the octree from a lowest resolution level to a highest resolution level.

The graphic object is sampled by casting rays through the object. The rays originate at orthogonal planes surrounding the object. The surface of the object is sampled for shape and shade attributes at points where the rays intersect the surface. The sampled shape and shade attributes of each sampled point are stored in the octree stored in the memory.

Shade attributes of the surface points of the a graphic object are filtered by constructing tangential disks at positions of each surface point. The tangential disks have increasingly larger radii. Each tangential disk is projected to an ellipse in texture space. View independent filter functions are applied at the position of each surface point to generate texture mipmaps for the surface point. The filter functions have an extent equal to the projected tangential disk. The surface point is projected to the pixels in the depth buffer, and a view dependent filter function is applied to each pixel in the image buffer to determine colors for the pixels.

BRIEF DESCRIPTION OF THE DRAWINGS

FIG. 4 is a diagrammatic of layered depth cube sampling methods;

FIGS. 6a–b are diagrammatics of two levels of a LDC tree;

DETAILED DESCRIPTION OF THE PREFERRED EMBODIMENTS

Conceptual Overview of Surfels

Figure 1:
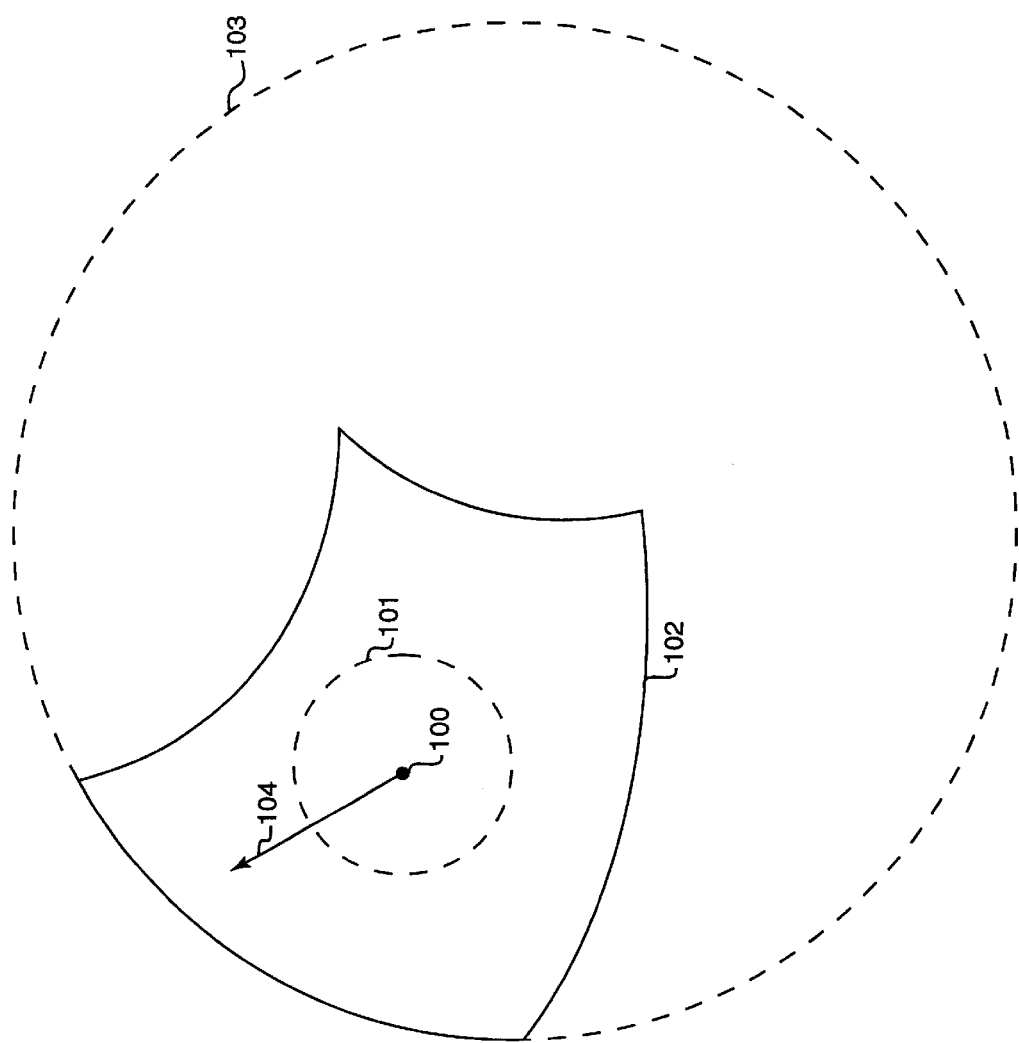
FIG. 1 is a diagrammatic of a surfel of a graphics object according to the invention.

We describe an image-based adaptive sampling and object-based rendering of graphic objects represented as surface elements, i.e., "surfels." As shown in FIG. 1, we define a surfel 100 as a zero-dimensional n-tuple with shade and shape attributes that locally approximates a portion 101 of a surface 102 of a graphic object 103. The shape attributes can include position, orientation, and depth information of the object. The shade attributes can include texture, material properties, and opacity. As described in greater detail below, we store surfels as a reduced layered depth cube (LDC) tree.

The surfel representation of our invention is a projection of an image space resolution into the object space, resulting in an arbitrary 2D manifold. In other words, our surfel position attributes have object space coordinates with image space resolution. Surfel manifolds can be connected to each other to form a more complex 2D manifold. The manifold "outlines" arbitrary objects, real or imagined.

In contrast with our techniques, prior art rendering primitives are usually sampled with an object space resolution. Our representation combines object space rendering and image space sampling by defining a mapping between object surfels and image plane pixels. Surfels are generated according to the image resolution. Thus, no detail smaller than a pixel is considered when sampling the object. By combining the object space coordinates and image space resolution sampling, we provide rendering that is simple, efficient and fast. We describe an object-order projection process to pixels. Using a technique called visibility splatting, occluded surfers are discarded, and a continuous 2D image is reconstructed using interpolation techniques.

Sampling according to the image space resolution provides a direct correspondence between sampled object space and image space. By defining surfels this way, rendering of objects becomes easier in the sense that resampling of the object is not required during rendering, no matter what the viewing direction. Thus, rendering "surfelized" objects is more efficient. A surfel grid, with image space resolution, allows us to render presampled objects for any viewing direction.

Table A compares prior art polygons, voxels, and point samples with surfels according to our invention. The table shows that our surfers have attributes similar to known prior art representation primitives.

TABLE A

| Property | Polygons | Voxels | Points | Surfels |
| --- | --- | --- | --- | --- |
| Geometry | Yes | No | No | No |
| Sampling | Object | Object | Object | Screen |
| Grid | No | Yes | No | Yes |
| Connected | Yes | No | No | Yes |
| Deformation | Semi-hard | Hard | Easy | Easy |

In some ways, a surfel has the attributes of a pixel of a converted polygon when the polygon has a size of about one pixel. A surfel can also be considered as an extracted 8-connected surface voxel, where the cell in which the surfel is located has a dimension of 1×1×1 pixel, and has six adjacent surfels. A surfel object can also be thought of as a mapping of a particle cloud that is defined on the resolution of the image grid.

Surfels also have differences. For example, surfels are unlike voxels and particles in their geometry. Surfels are unlike polygons and particles with respect to a grid. Surfels are unlike voxels and particles in the way that neighboring elements are related. Surfels are unlike points in that they are sampled according to an expected output screen resolution and not according to object space criteria. Surfels also are different from points in that they have not an explicit but an implicit connectivity that arises from the discrete surfel sampling grid.

Compared with prior art primitives, the most important difference in the way that we define surface elements is that surfels are sampled according to the image space resolution. Voxels and particles are usually sampled according to the object space resolution. Polygons can be sampled at image resolution, however, the sampling must be done just prior to projection or rendering when the object is deformed because the sampling is view dependent. For surfels, the sampling to image resolution can be done once in a preprocessing step because the sampling is view independent.

In the image space resolution sampling according to our invention, graphic objects include just enough surfels to reconstruct the surface of the object by a simple projection of the surfels to an image plane, followed by image reconstruction. For example, a rectangular surfel polygon of 100 by 100 surfels will produce 100 by 100 pixels on the image plane. The image plane is physically expressed as pixels in an image buffer. Normally, the contribution of a surfel to the image will be about one to one.

Preprocessing and Rendering

Our invention deals with graphic objects in two stages, preprocessing and rendering. In a preprocessing stage, we sample a graphic object and then filter the sampled data. We preprocess a particular graphic object only once. The sampling can be done by software programs. Because this is a one time operation, sophisticated techniques can be used to extract as much attribute information from the object as possible, and to reduce the sampled object to a data structure that is efficient to render for any viewing direction to produce quality images. In the rendering stage, we render the data structure. Here, we use a hardware pipeline. Pragmatically, we do the hard work once, so that the work we have to do many times becomes easy. This makes our pipelined surfel rendering well-suited for animation applications.

Sampling and Prefiltering

Figure 2:
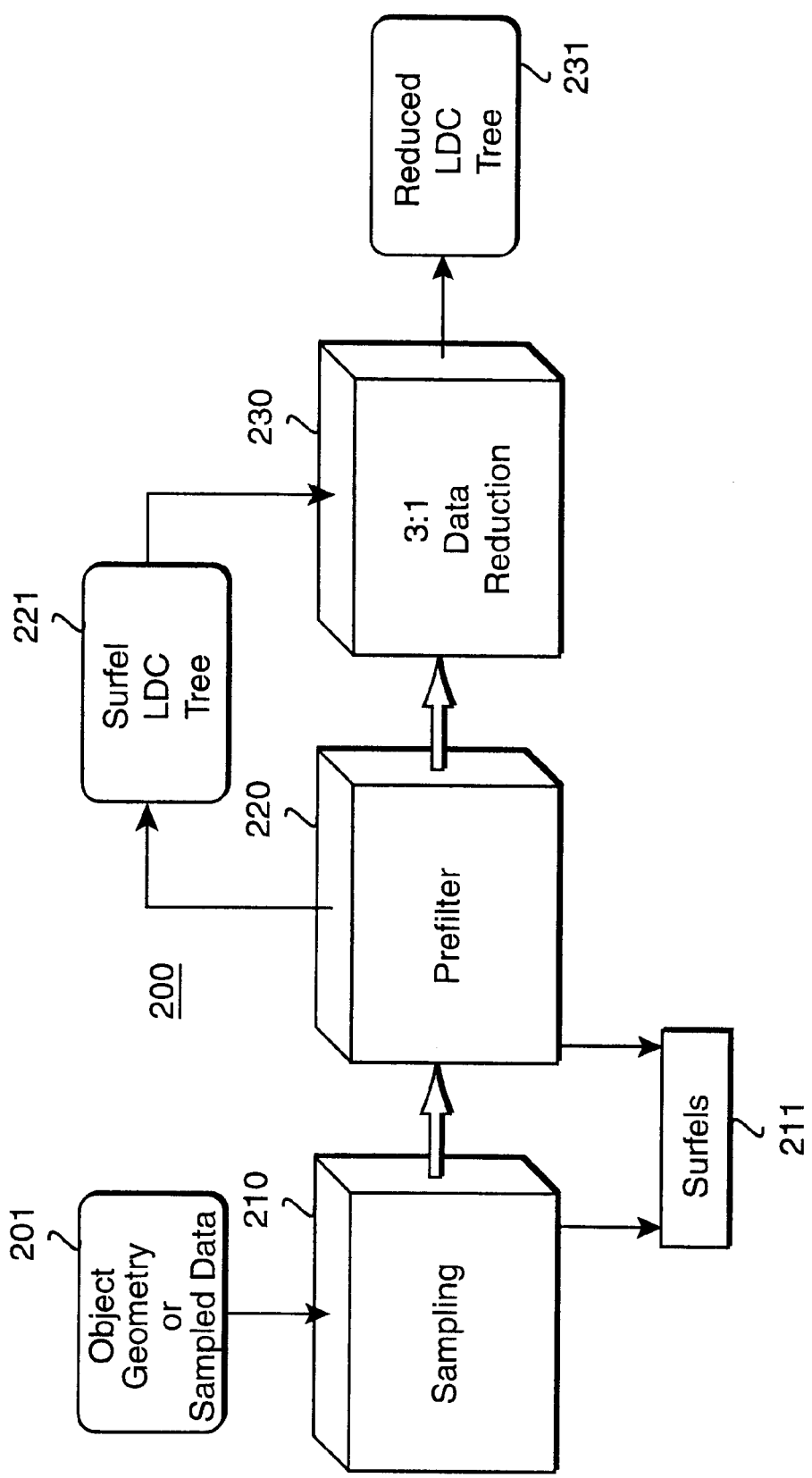
FIG. 2 is a block diagram of a preprocessing sampling stage.

FIG. 2 is a high level block diagram of a sampling preprocessing stage 200. An adaptive sampling process 210 converts a graphic object 201 and its textures attributes to surfels 211. During sampling, we use ray casting to arrange the surfels in three orthogonal layered depth images (LDIs). The LDIs store multiple surfels along each ray, one for each ray-surface intersection point. We call this arrangement of three orthogonal LDIs a layered depth cube (LDC) or "block." For example, we can use a sampling resolution of $512^2$ for an expected output resolution of $480^2$. That is, we chose a sampling resolution to provide a predetermined image quality.

A prefiltering step 220 is described in greater detail below. The main purpose of this step is to extract view-independent texture attributes of the blocks. In our data structure, a LDC "block" is attached to each leaf node of an octree 221. Octrees are well known in computer graphics see for example, Veenstra et al. in "Line drawings of octree-represented objects, ACM Transactions on Graphics, Vol.7, No. 1, pp. 61–75, January 1988. The octree is used to index three dimensions. Each level of our LDC tree corresponds to a different resolution of the surfel object. In a data reduction step 230, we optionally reduce each block tree to a reduced LDC tree 231. Preferrably, the reduction can be three to one. This reduces storage costs, and further improves rendering performance.

An important and novel aspect of our sampling method is a distinction between sampling shape, (geometry) and sampling shad, (texture color). A surfel stores shape attributes, such as surface position, and orientation, e.g., the surface normal 104 in FIG. 1. In our preferred embodiment, the x-y position is implicitly defined by the location of the block (node) in the LDC tree 221, that is, explicit xy coordinates are not stored. Depth information (z coordinates) are explicitly stored in the octree. The orientation of the surface is given by the surface normal 104, see FIG. 1. Instead of actually storing a normal, we store an index to a quantized normal table that is used during reflection and environment map shading. As stated above, the shape attributes are based on object space.

Shade is expressed as multiple levels of prefiltered texture colors. We call this novel hierarchical color information a surfel texture mipmap. During the prefiltering 220, other view-independent methods, such as bump and displacement mapping, can also be performed to extracted shape and shade attributes.

Table B gives the minimum storage requirements per surfel.

TABLE B

| Data Field | Storage |
| --- | --- |
| Three Surfel Texture Mipmap Levels | 3 × 24 bits |
| Index to Normal Table | 16 bits |
| LDI Depth Value | 32 bits |
| Index to Material Table | 16 bits |
| Total Bytes per Surfel | 17 bytes |

The size of the LDC tree is about a factor of two larger than the sampled data due to overhead, e.g., pointers, in the octree data structure. The LDC tree can be substantially compressed by run length coding or wavelet-based compression techniques.

Rendering Pipeline

Figure 3:
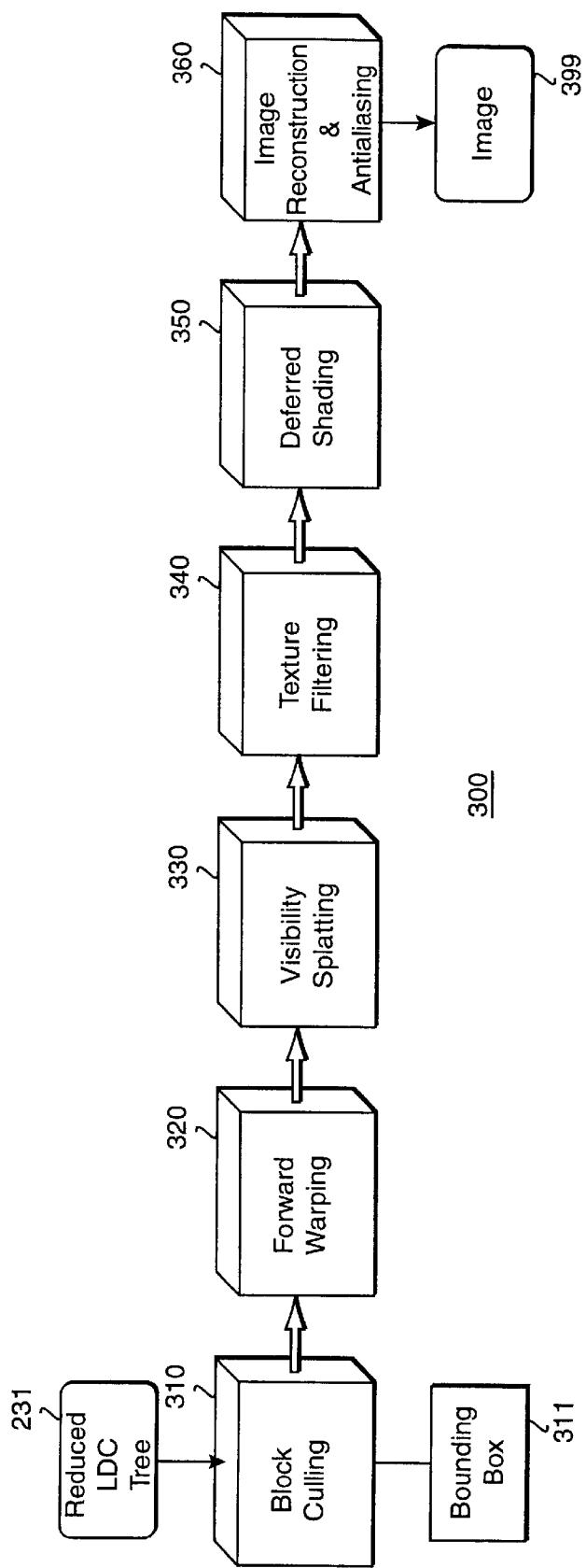
FIG. 3 is a block diagram of a surfel rendering pipeline.

FIG. 3 shows a rendering pipeline 300 for our surfels. The pipeline hierarchically projects the blocks (nodes) of the LDC tree blocks to pixels of the image plane 399 using perspective projection. Note, the orientation of the image plane for the purpose of rendering can be arbitrary, and different than the orientation of the three orthogonal depth images used during sampling.

The rendering is accelerated by block culling 310 and fast incremental forward warping 320. We estimate the projected surfel density per output pixel to control rendering speed and quality of the image reconstruction.

A depth-buffer (z-buffer), together with a novel method called visibility splatting 330 solves a visibility problem. Here, tangential disks, at each surfel, are scan-converted into a z-buffer in order to detect surface holes and prevent hidden (occluded) surfels from being used in the reconstruction process.

Texture colors of visible surfels are filtered 340 using linear interpolation between appropriate levels of the surfel texture mipmaps. Each visible surfel is shaded 350 using, for example, Phong illumination and reflection mapping. The final step 360 performs image reconstruction from visible surfels, including hole filling and antialiasing. In general, the resolution of the output image and the depth-buffer does not have to be the same.

The steps of the preprocessing 200 and rendering 300 stages are now described in greater detail.

Sampling

During adaptive sampling 210, our goal is to find an optimal surfel representation of the object's shape and shade attributes with minimum redundancy. Most prior art sampling methods perform object discretization as a function of geometric parameters of the object's surface, such as curvature or silhouettes. That object space discretization typically leads to too many or too few primitives for rendering. In our surfel representation, object sampling is aligned to the image space resolution, that is, the sampling substantially matches the expected output resolution of the image.

LDC-Sampling

As shown in FIG. 4*a* for only two of the three layered depth images (LDI 1) 401 and (LDI 2) 402, we sample a graphic object 410 from three sides of a cube into three orthogonal LDIs called a layered depth cube (LDC). As stated above, the sampling is done at an expected output image space resolution. Ray casting records all intersections of the rays with the objects surface 411, including backfacing surfaces. The intersections with LDI 1 are shown as circles, and with LDI 2 as squares. FIG. 4*b* is an enlargement of a portion of FIG. 4*a*.

At each intersection point, we generate a zero-dimensional surfel 412 with floating point depth data and other shape and shade attributes. Perturbation of the surface or of the geometry for bump and displacement mapping can be performed on the geometry before sampling or during ray casting using procedural shaders. LDC sampling allows us to easily build a hierarchical data structure, which would be difficult to do from multiple arbitrarily oriented depth images.

Adequate Sampling Resolution

Given an LDC pixel spacing of h, we can determine the resulting sampling density on the surface by constructing a Delaunay triangulation on the object surface using the generated surfels as triangle vertices. The imaginary triangle mesh generated by this sampling process has a maximum sidelength $s_{max}$ of $\sqrt{3}$ h. The minimum sidelength $s_{min}$ is zero when two or three sampling rays intersect at the same surface position. The object is adequately sampled when we guarantee that at least one surfel is projected into the support of each output pixel filter for orthographic projection and unit magnification. That condition is met when $s_{max}$, the maximum distance between adjacent surfers in object space, is less than the radius of the pixel reconstruction filter. Typically, we choose the LDC resolution to be slightly higher than this because of the effects of magnification and perspective projection. For example, recall we sample at $512^2$ for a $480^2$ image resolution.

Texture Prefiltering

As a feature, we prefilter 220 surfel textures, and the textures are mapped to object space during the preprocessing stage. To prevent view-dependent texture aliasing, we also apply per surfel texture filtering during rendering as described below.

Figure 5B:
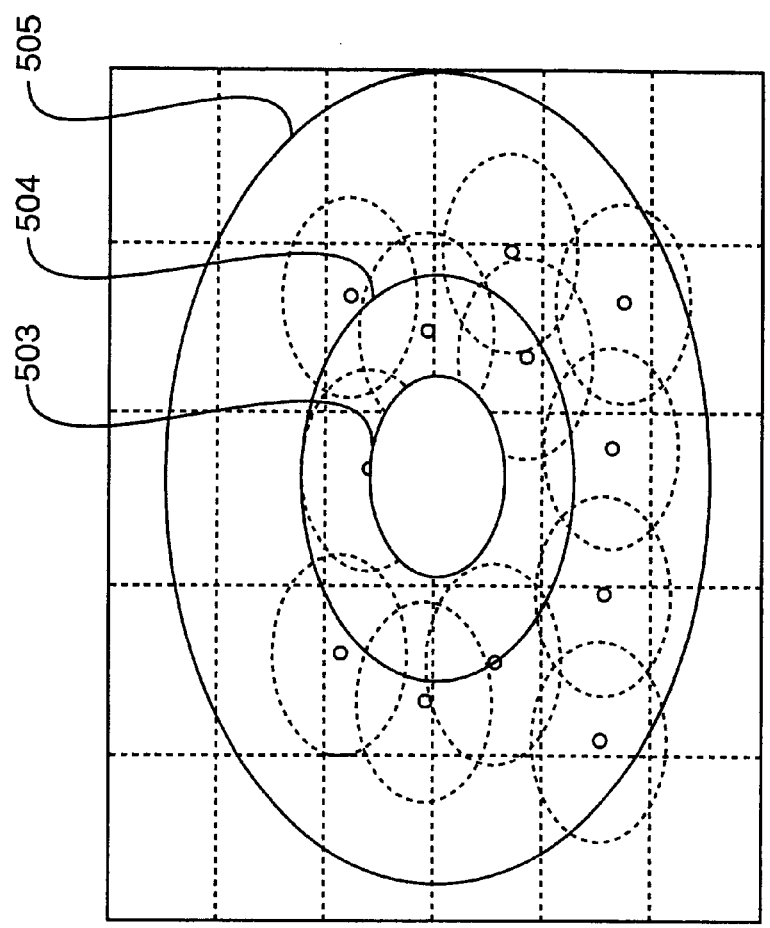
FIGS. 5a–b are diagrammatics of texture prefiltering.
Figure 5A:
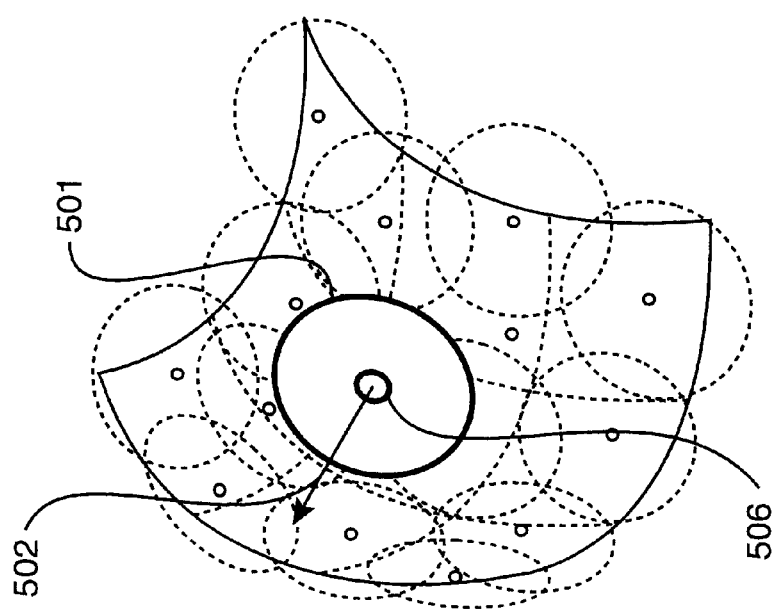

As shown in FIG. 5*a* for object space, we center a circle 501 at each surfel 506. The tangent plane of the circle determines the extent of the filter footprint in texture space. We call these circles 501 tangential disks. The disks are orthogonal to the orientation 502 of the corresponding surfel 506.

As shown in FIG. 5*b*, each tangential disk is mapped to an ellipse 503 in texture space using a predefined texture parameterization of the surface. A Gaussian kernel can be used to filter the texture. The resulting color is assigned to the surfel. To enable adequate texture reconstruction, the circles and elliptical filter footprints (dotted lines) in texture space overlap each other as shown in FIGS. 5*a–b*.

Consequently, we choose $s_{max}=\sqrt{3}$ h, the maximum distance between adjacent surfels in object space, as the radius for the tangential disks. This usually guarantees that the tangential disks overlap each other in object space and that their projections in texture space overlap. Because we use a modified z-buffer filling method to resolve visibility, as described below, not all surfels may be available for image reconstruction. This can lead to texture aliasing artifacts. Therefore, we store several, typically at least three prefiltered texture samples per surfel. The tangential disks have increasingly larger radii. Each of the disks is mapped to texture space and used to compute the prefiltered colors. We call the prefiltered colors a surfel texture mipmap. FIG. 5*b* shows the elliptical footprints 503–505 of the increasingly larger elliptical tangential disks in texture space.

Data Structure

We use an efficient hierarchical data structure to store the LDCs acquired during sampling. The LDC octree 221 allows us to quickly estimate the number of projected surfers per pixel and to trade rendering speed for higher image quality.

LDC Tree

We avoid resampling and splatting during image reconstruction by storing LDCs at each node (block) in the octree that are subsampled versions of the highest resolution LDC. Our octree is recursively constructed from the bottom up. The highest resolution LDC—acquired during geometry sampling—is stored at the lowest level (n=0) of the LDC tree, and the lowest resolution at the top.

As shown in FIGS. 6*a–b* for two dimensions, each LDC can be subdivided into blocks with user-specified dimension

601. FIG. 6a shows the highest resolution blocks of the LDC tree using a 2D drawing. Blocks (nodes) on higher levels of the octree, i.e., lower resolution, are constructed dyadically, i.e., by subsampling their children at multiples of some power of two. FIG. 6b shows level n=1 of the LDC tree. Note that surfels at higher levels of the octree 602 reference surfels in the LDC of level 0 604, i.e., surfels that appear in several blocks of the hierarchy are stored only once, and are shared between blocks.

If the highest resolution LDC has a pixel spacing of h, then the LDC at level n has a pixel spacing of $2^n$h. The height of the LDC tree is selected by the user. Choosing a height of one flattens the hierarchy, storing only the highest resolution LDC. Because the LDC tree naturally stores a level-of-detail representation of the surfel object, its lowest resolution usually determines the height of the octree.

Empty blocks 603, shown as white squares in FIG. 6a, are not stored in the LDC tree. Consequently, the block dimension 601 is not related to the dimension of the highest resolution LDC, and can be selected arbitrarily. Choosing the block dimension b=1 makes the LDC tree a fully volumetric octree representation.

Three-to-One Reduction

To reduce storage and rendering time, it can be useful to optionally reduce the LDC tree to a layered depth image on a block-by-block basis. Because this typically corresponds to a three-fold increase in warping speed, we call this step 3-to-1 reduction 230. First, we choose one LDI in the block as the target LDI. We warp and resample the two remaining LDIs to the pixels of the target LDI.

Figure 7B:
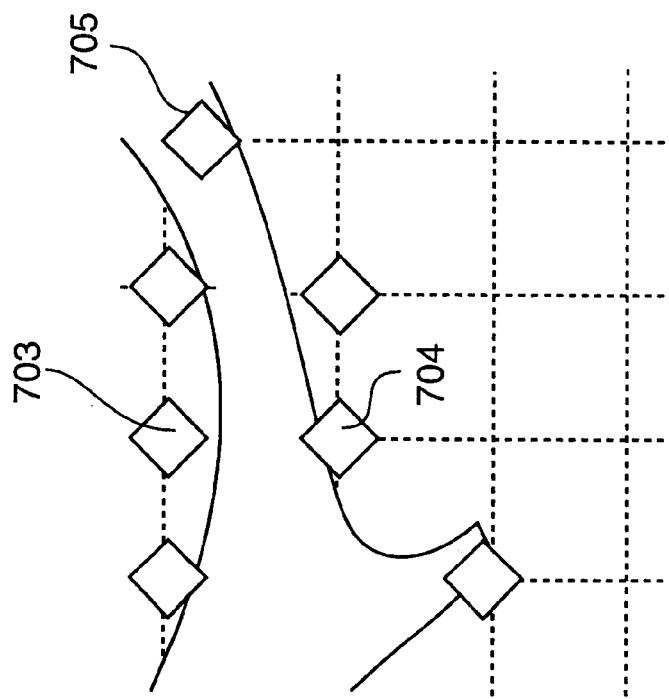
FIGS. 7a–b are diagrammatics of LDC reduction.
Figure 7A:
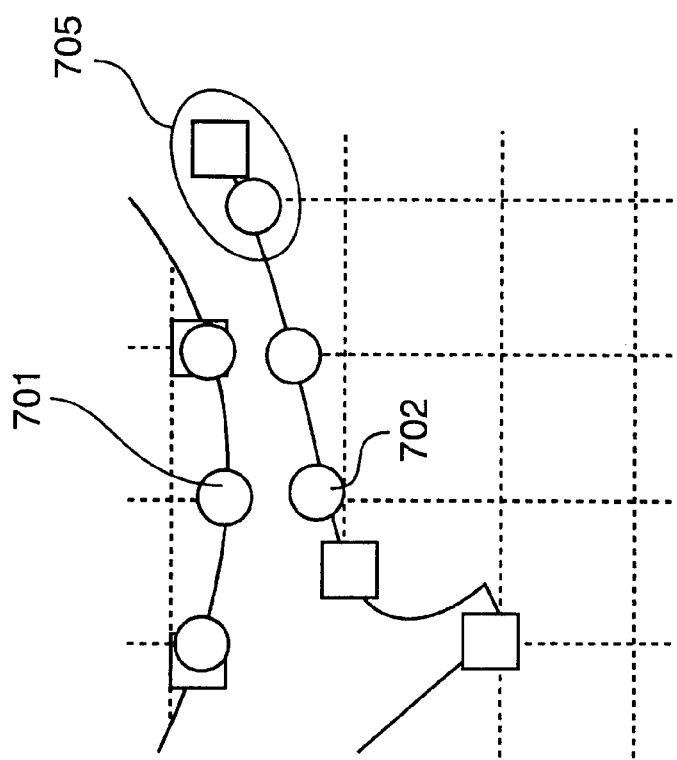

As shown in FIGS. 7a and 7b, surfels 701–702 in FIG. 7a are resampled to grid locations of sampling ray intersections 703–704 as shown in FIG. 7b. We use nearest neighbor interpolation, although more sophisticated filters, e.g. splatting can also be implemented. The resampled surfels are stored in the reduced LDC tree 231.

The reduction and resampling process degrades the quality of the surfel representation, both for shape and for shade. Resampled surfels from the same surface may have very different texture colors and normals 705. We could compare distances against a threshold to determine when surfels belong to the same surface. However, surfels from different surfaces may be closer than the threshold, which usually happens for thin structures. This may cause color and shading artifacts that are worsened during object motion. In practice, however, we did not encounter severe artifacts due to 3-to-1 reduction. Because our rendering pipeline handles LDCs and LDIs the same way, we can store blocks with thin structures as LDCs, while all other blocks can be reduced to single LDIs.

We can determine bounds on the surfel density on the surface of the object after 3-to-1 reduction. Given a target LDI with pixel spacing h, the maximum distance between adjacent surfels on the object surface can be expressed as $s_{max}=\sqrt{3}h$ like in the original LDC tree. The minimum distance between surfels increases to $s_{min}=h$ due to the elimination of redundant surfels, making the imaginary Delaunay triangulation on the surface more uniform.

Rendering Pipeline

The rendering pipeline 300 takes the surfel LDC tree 221 or the reduced LDC tree and renders it as an image 399 using hierarchical visibility culling and forward warping of blocks for a particular image plane orientation. Hierarchical rendering also allows us to estimate the number of projected surfels per output pixel. For maximum rendering efficiency, we project approximately one surfel per pixel and use the same resolution for the z-buffer as in the output image. For maximum image quality, we project multiple surfels per pixel, using a finer resolution of the z-buffer and high quality image reconstruction.

Block Culling

We traverse the LDC tree from top, i.e., the lowest resolution nodes, to the bottom or the highest resolution nodes. For each block/node, we first perform view frustum culling using a block bounding box 311. Because the viewing orientation can be arbitrary, different views may reveal different portions of the octree. Next, we use visibility cones to perform the equivalent of backface culling of blocks. Using the surfel normals, we pre-compute a visibility cone per block which gives a fast, conservative visibility test—no surfel in the block is visible from any viewpoint within the cone. In contrast to prior art point sampling rendering, we perform all visibility tests hierarchically in the LDC tree, which makes our tests more efficient.

Block Warping

Figure 8:
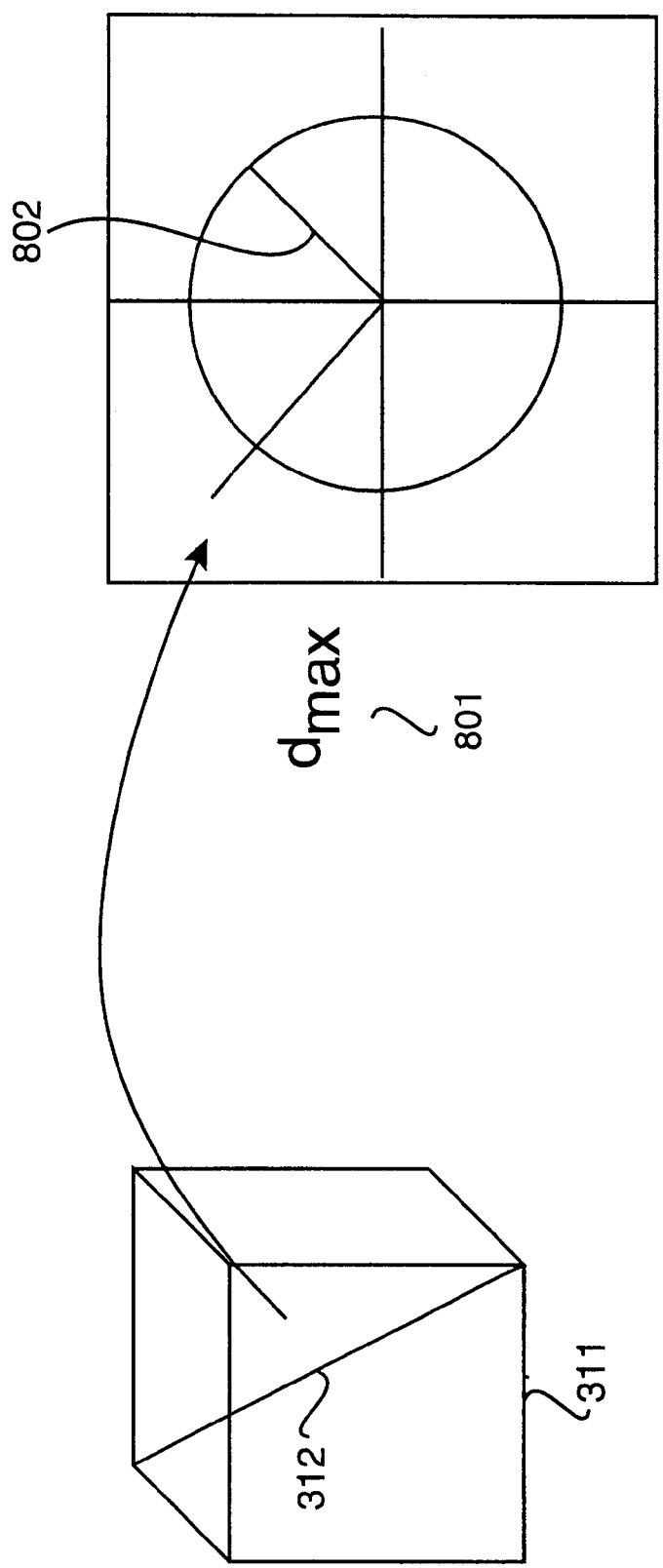
FIGS. 8 is diagrammatics of surfel density estimation.

As shown in FIG. 8, to choose the octree level to be projected, we conservatively estimate, for each block, the number of surfels per pixel. We can choose one surfel per pixel for fast rendering, or multiple surfels per pixel for supersampling. The number of surfels per pixel is determined by $d_{max}$ 801. The value $d_{max}$ is the maximum distance between adjacent surfels in image space.

We estimate $d_{max}$ per block by projecting the four major diagonals 312 of the block bounding box 311. For orthographic projection, their maximum length is an upper bound on $d_{max}$. The error introduced by using orthographic projection is small because a block typically projects to a small number of pixels.

During rendering, the LDC tree is traversed top to bottom. At each level, $d_{max}$ is compared to the radius r 802 of the pixel reconstruction filter. If $d_{max}$ of the current block is larger than r, then its children are traversed. We project the block whose $d_{max}$ is smaller than r, then rendering approximately one surfel per pixel. The surfel density per pixel can be increased by choosing a smaller r, e.g., making r the diagonal of a subpixel. During forward warping, $d_{max}$ is stored with each projected surfel for subsequent use in the visibility splatting and the image reconstruction stages.

To warp the position attributes of the LDC blocks to image space, we use an optimized incremental block warping. Recall, the positional attributes of our surfels are expressed with object space coordinates. Hence, we warp from object to image space. This warping is highly efficient due to the regularity of our LDCs. The LDIs in each LDC block are warped independently, which allows us to render an LDC tree where some or all blocks have been reduced to single LDIs after 3-to-1 reduction as described above.

Visibility Splatting

Perspective projection, high z-buffer resolution, and magnification or zooming may lead to undersampling or "holes" in the z-buffer (depth buffer). A z-buffer pixel is defined as a hole when the pixel does not contain at least one corresponding visible surfel or background pixel projection. The holes have to be marked for image reconstruction. We call our novel marking approach visibility splatting. Image reconstruction is described below.

Depth Buffer

Figure 9B:
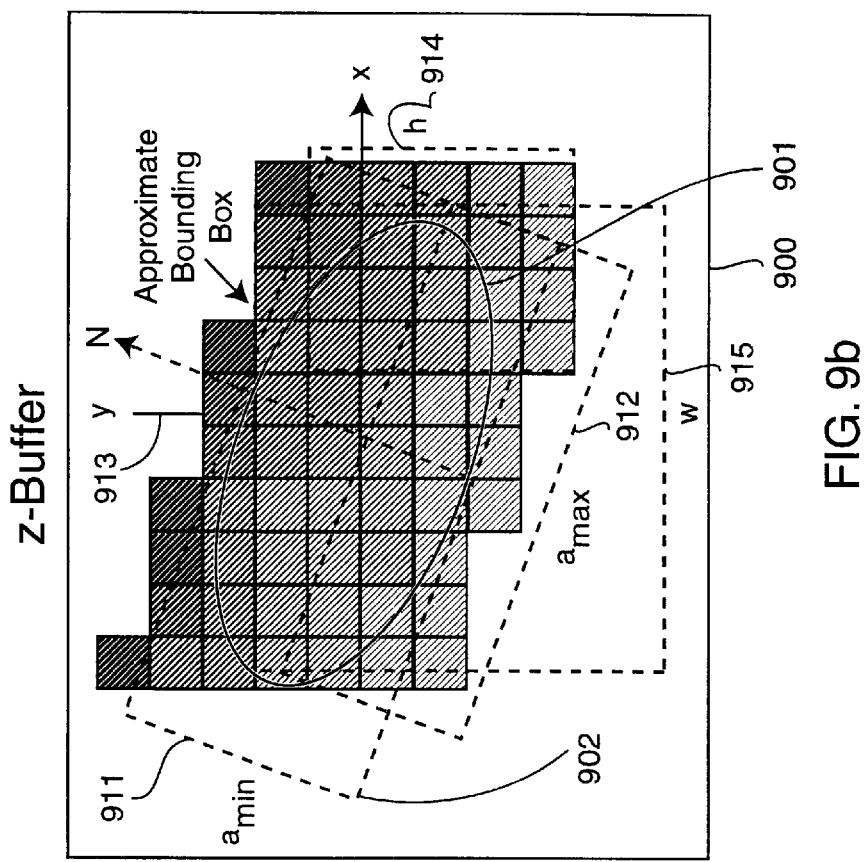
FIGS. 9a–b are diagrammatics of visibility splatting.
Figure 9A:
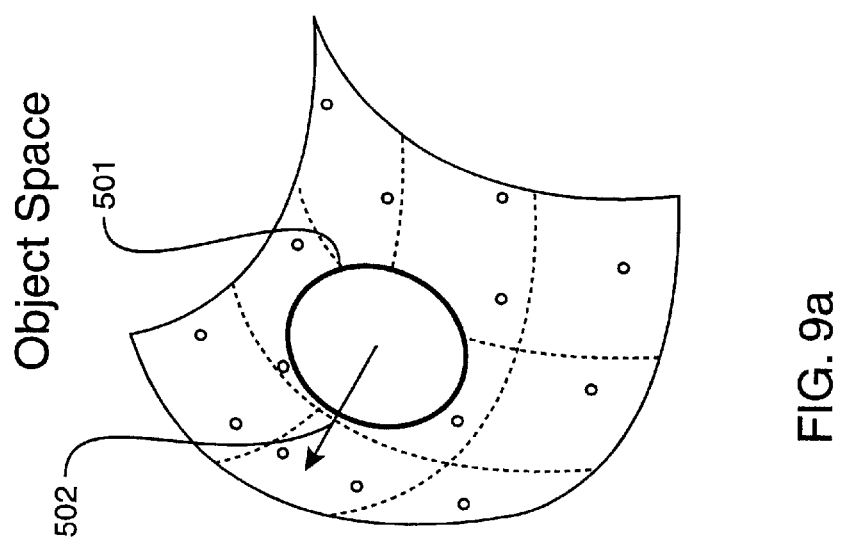
Figure 9C:
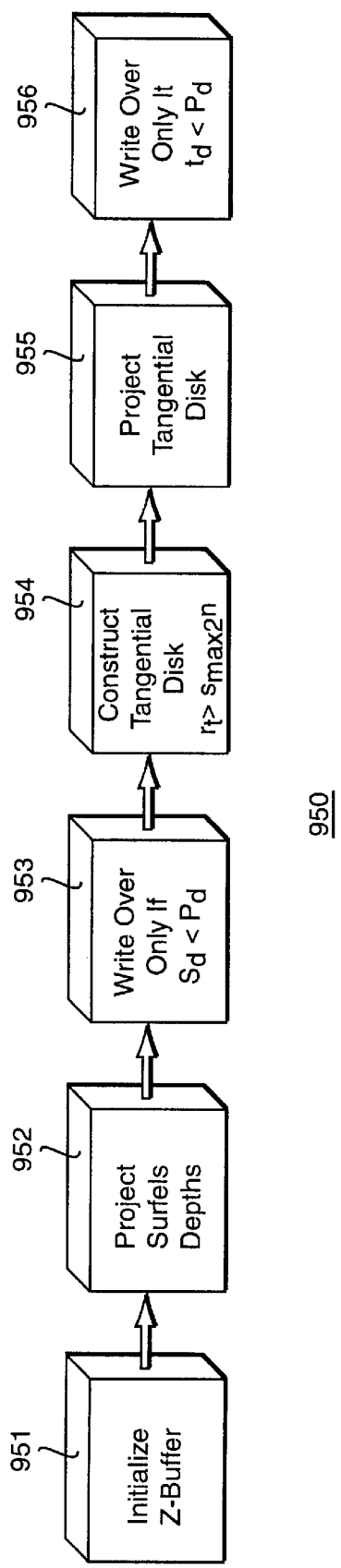
FIG. 9c is a flow diagram of a method for storing depth values in a z-buffer.

We populate the z-buffer with depth values as shown in the steps 950 of FIG. 9c.

Each pixel of the z-buffer stores a pointer to a nearest surfel, i.e., the surfel which has the smallest depth (z) value, and a current minimum depth value. Pixels are also marked as "holes," or not. The pixels of our z-buffer are initialized 951 with maximum depth values, e.g., "infinity" or a background scene, and no holes.

Surfels depths are projected 952 to the z-buffer using nearest neighbor interpolation. Recall from Table B, the surfel depth is stored with each surfel. The z-buffer offers a good tradeoff between quality and speed, and our z-buffer can be integrated with traditional polygon graphics rendering methods, such as OpenGL™. Depth values of the z-buffer pixels are only overwritten 953 if the depth value of the surfel ($s_d$) is less than the depth value of the pixel ($p_d$). Thus, only surface features lying in front of other surface features are visible. In step 954, tangential disks 501 are constructed for each surfel 502 in object space.

As shown in FIGS. 9a–b, we scan-convert the projection of surfel tangential disks 501 into the z-buffer 900 to correctly resolve visibility problems due to holes and back facing surfaces. The tangential disks that are constructed 954 have a radius of $r_t = s_{max} 2^n$, where $s_{max}$ is the maximum distance between adjacent surfels in object space and n is the level of the block. The disks have an orientation determined by the surfel normal 502.

As shown in FIG. 9b after projection 954, the tangential disks form an ellipse 901 around the surfel. We approximate the ellipse 901 with a partially axis-aligned bounding box 902. The bounding box parallelogram is scan-converted, and each z-buffer pixel is filled with the appropriate depth, depending on the surfel normal N 502. That is, if a depth value is less than a previously stored depth value, the stored depth value is overwritten.

We use orthographic projection in step 955 for our visibility splatting to simplify the calculations. The direction of a minor axis $a_{min}$ 911 of the projected ellipse is parallel to the projection of the surfel normal N. A major axis $a_{max}$ 912 is orthogonal to $a_{min}$. The length of the major axis is the projection of $s_{max}$, which is approximated by $d_{max}$ 801 of FIG. 8. This approximation takes the orientation and magnification of the LDC tree during projection into account.

Next, we calculate the coordinate axis that is most parallel to $a_{min}$, e.g., the y-axis 913 in FIG. 9b. The short side of the bounding box is axis aligned with this coordinate axis to simplify scan conversion. The height h 914 of the bounding box is determined by intersecting the ellipse with the coordinate axis. The width w 915 of the bounding box is determined by projecting the vertex at the intersection of the major axis and the ellipse onto the x-axis.

The values $\partial z/\partial x$ and $\partial z/\partial y$ are the partial derivatives of the surfel depth z with respect to the image x and y direction. These are constant because of the orthographic projection and can be calculated from the unit normal N. During scan conversion, the depth at each pixel inside the bounding box is calculated using the partial derivatives $\partial z/\partial x$ and $\partial z/\partial y$. In addition, we add a small threshold $\epsilon$ to each projected z value. The threshold $\epsilon$ prevents the surfels that lie underneath the disk but still on the foreground surface from accidentally being discarded. In step 956, the depth values of the pixels ($p_d$) are overwritten with the depth values of the projected tangential disk ($t_d$) if $t_d < p_d$.

If the surface is extremely curved, then the tangential disks may not cover the surface completely, potentially leaving tears and holes. In addition, extreme perspective projection makes orthographic projection a bad approximation to the actual projected tangential disk. In practice, however, we did not see this as a major problem. If the projected tangential disk is a circle, i.e., the disk is almost parallel to the viewing direction, then the bounding box parallelogram is a bad approximation. In this case, we use a square bounding box instead.

It should be noted that our method for determining z-buffer depth values can also be used with polygons that are rasterized to pixels, with voxels, and other traditional point representations of objects. Our method can populate any z-buffer, independent of the underlying representation of the graphic object.

Texture Filtering

As described above, each surfel in the LDC tree stores several prefiltered texture colors in the surfel texture mipmap. During rendering, the surfel color is linearly interpolated from the surfel texture mipmap colors depending on the object minification and surface orientation.

Figure 10B:
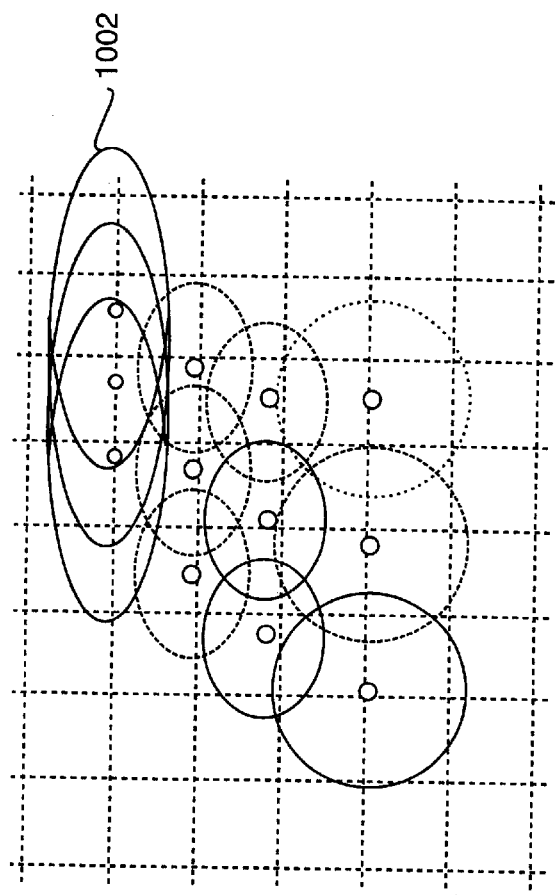
FIGS. 10a–b are diagrammatics of projected surfel texture mipmaps.
Figure 10A:
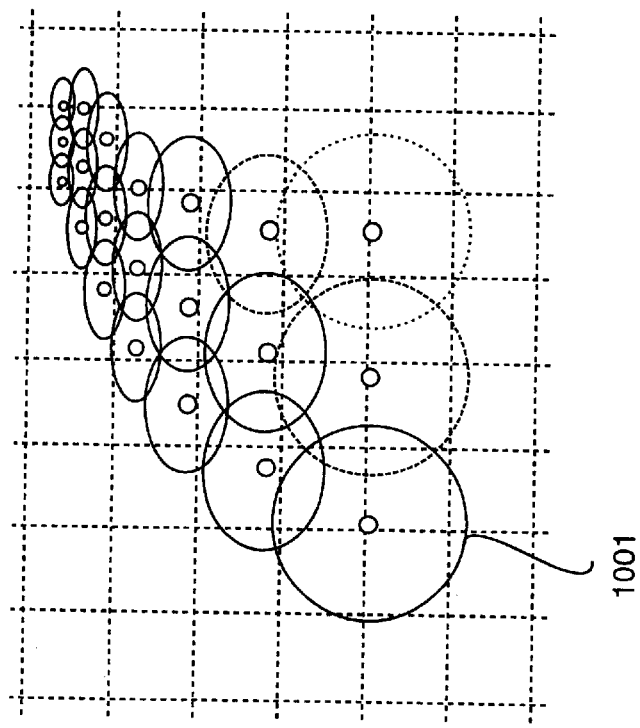

FIG. 10a shows all visible surfels of a sampled surface projected to the z-buffer. The ellipses 1001 around the centers of the surfels mark the projection of the footprints of the highest resolution texture prefilter, as described above. Note that during prefiltering, we try to cover the entire surface with footprints. In FIG. 10b, the number of samples per z-buffer pixel is limited to one by applying z-buffer depth tests. A surfel pointer in the z-buffer is replaced with another pointer when another closer surfel is located for the same pixel.

In order to fill the gaps appearing in the coverage of the surface with texture footprints, the footprints of the remaining surfels have to be enlarged. If surfels are discarded in a given z-buffer pixel, then we can assume that the z-buffer pixels in the 3×3 neighborhood around the discarded pixels are not holes. Thus, the gaps can be filled when the texture footprint of each surfel covers at least the area of a z-buffer pixel. Consequently, the ellipse of the projected footprint has to have a minor radius of $\sqrt{2}s$ in the worst case, where s is the z-buffer pixel spacing. We ignore the worst case and use $\sqrt{2}/2s$, implying that surfels are projected to z-buffer pixel centers. FIG. 10b shows the scaled texture footprints 1002 as ellipses around projected surfels.

Figure 11:
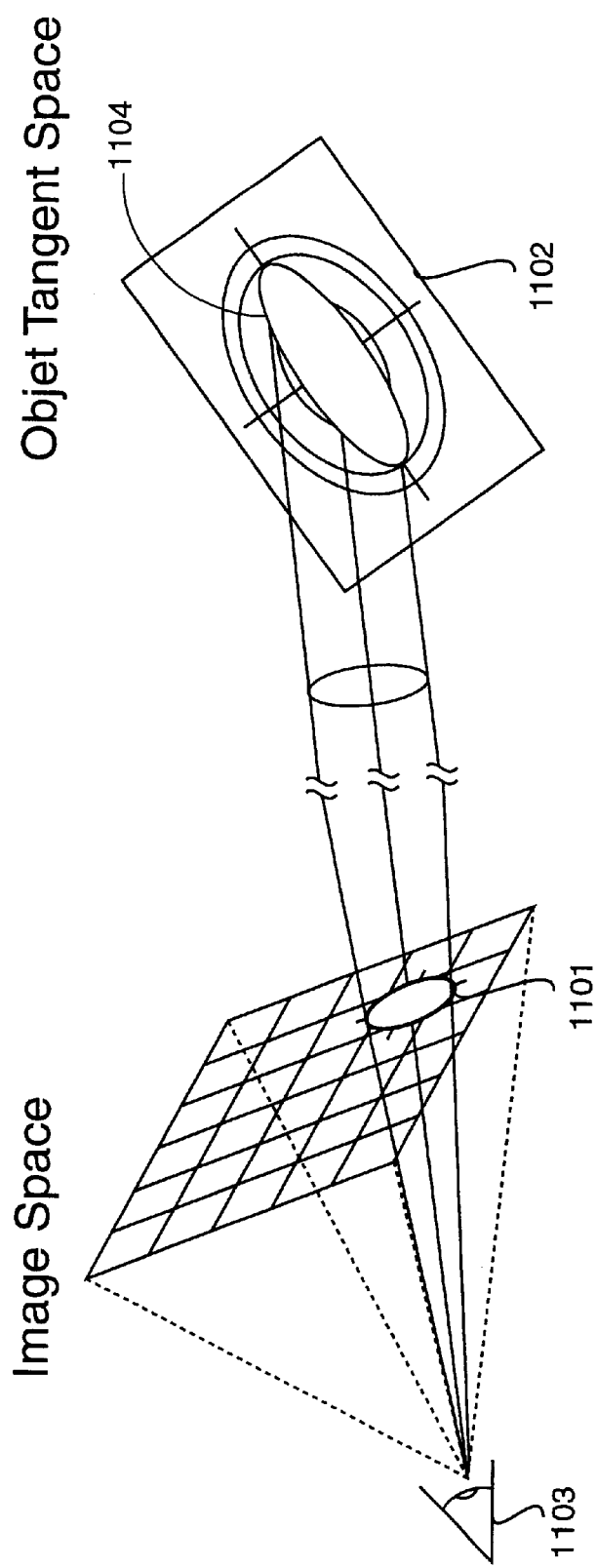
FIG. 11 is a diagrammatic of view-dependent texture filtering.

As shown in FIG. 11, we use view-dependent texture filtering to select the appropriate surfel texture mipmap level. A circle 1101 with radius $\sqrt{2}/2s$ is projected through an image space pixel onto a tangential plane 1102 of the surface from the direction of the view 1103, producing an ellipse 1104 in the tangent plane. The projection of the pixel is approximated with an orthographic projection. Similar to isotropic texture mapping, the major axis of the projected tangent space ellipse is used to determine the surfel mipmap level. The surfel color is determined by linear interpolation between the closest two mipmap levels. This is a linear interpolation between two samples, as opposed to interpolating eight samples as in tri-linear mipmapping.

Shading

In the prior art, an illumination model is typically applied before visibility testing. However, deferred shading after visibility splatting according to the invention avoids unnecessary work. Also, prior art particle shading is usually performed in object space to avoid transformation of normals to image space. However, we have already transformed the normals to image space during our visibility splatting as described above. With the transformed normals at hand, we can use cubic reflectance and environment maps to calculate a per surfel Phong illumination model with global effects. Shading with per surfel normals results in specular highlights that are of ray tracing quality.

Image Reconstruction and Antialiasing

To reconstruct a continuous surface from projected surfers is fundamentally a scattered data interpolation problem. In contrast with the prior art techniques such as splatting, we separate visibility calculations from image reconstruction. We mark z-buffer pixels with holes during our innovative visibility splatting as described above. These hole pixels are not used during image reconstruction because they do not contain any visible samples.

Figure 12B:
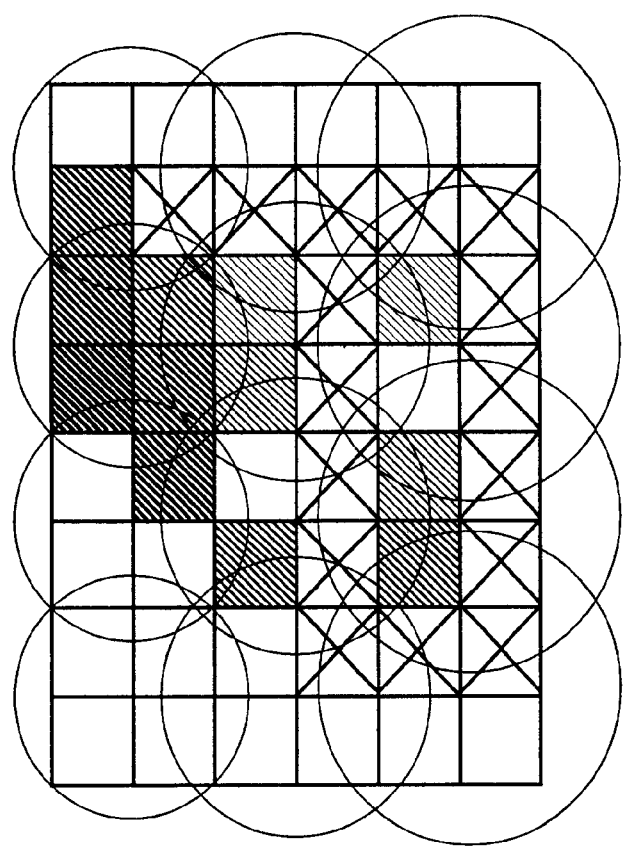
FIGS. 12a–b are diagrammatics of image reconstruction.
Figure 12A:
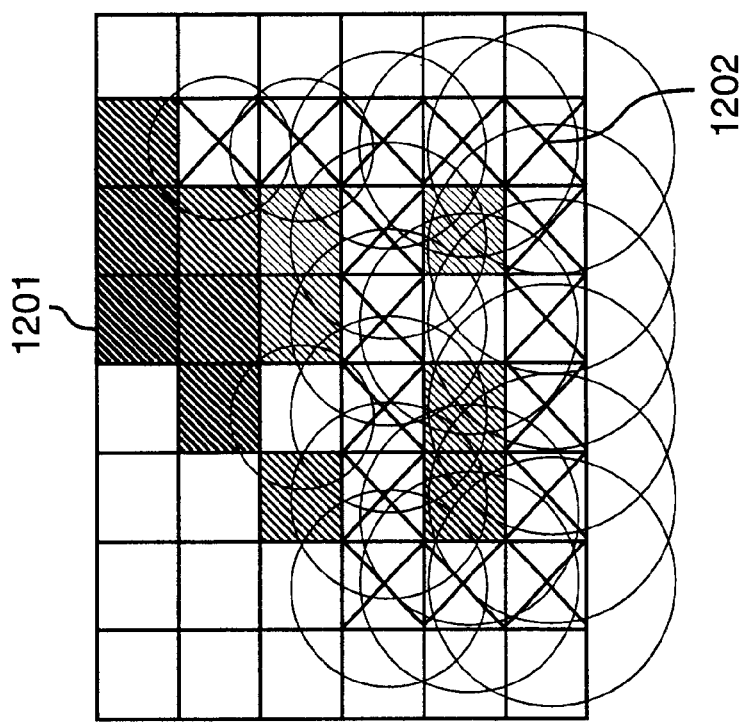

FIGS. 12a–b show image reconstruction in the z-buffer according to the invention. In FIG. 12a, the image (frame) buffer has the same resolution as the z-buffer. Surfels are mapped to pixel centers 1201 using nearest neighbor interpolation as shown with cross hatching. Holes 1202 are marked with a black X.

Recall, during forward warping, each surfel stores $d_{max}$ as an estimate of the maximum distance between adjacent projected surfels of a block. This distance is a good estimate for the minimum radius of a pixel filter that contains at least one surfel. To interpolate the holes, we can use, for example, a radially symmetric Gaussian filter with a radius slightly larger than $d_{max}$ positioned at hole pixel centers. Alternatively, to fill the holes, we can also adapt a pull-push method as described by Gortler et al. in *"The Lumigraph"* Computer Graphics, SIGGRAPH Proceedings, pp. 43–54. August 1996.

As shown in FIG. 12b, a high-quality alternative uses supersampling. Here, an output image resolution is half, or some other fraction of the z-buffer resolution. Rendering for supersampling proceeds as before. During image reconstruction, we put a Gaussian filter at the centers of all output pixels to filter the subpixel colors. The radius of the filter is again $d_{max}$ to cover at least one surfel. The minimum radius is $\sqrt{2}/2s$, where s is the sidelength of an output pixel.

In yet another embodiment, we adapt an interactive version of the painterly rendering algorithm as described by Meier in *"Painterly Rendering for Animation"* SIGGRAPH Proceedings, pp. 477–484, August 1996. In our adaptation, we render an oriented brush texture with per pixel alpha version at each visible surfel in the z-buffer. The texture is centered at each visible surfel, and its RGBA pixels are multiplied by the surfel color. To orient the "brush," the surfel normal in image space is orthographically projected to the image plane and the texture is axis aligned with the resulting vector. The texture is then mapped to an output pixel using image space rasterization, similar to texture splatting. The brush size for each surfel can be the same, or per surfel normal or texture derivatives can be used to scale the textures. Alternatively, each surfel could store an index into a table with brush type, orientation, and size. In contrast to Meier, we do texture splatting after visibility splatting.

It is instructive to described how the color of an output pixel is determined for regular rendering and for supersampling in the absence of holes. For regular rendering, the pixel color is determined by nearest neighbor interpolation from the closest visible surfel in the z-buffer. The color of that surfel is determined by linear interpolation between two surfel texture mipmap levels. Thus, the output pixel color is determined from two prefiltered texture samples. In the case of supersampling, one output pixel contains the filtered colors of one surfel per z-buffer subpixel. Thus, up to eight prefiltered texture samples may contribute to an output pixel for 2×2 supersampling. This produces image quality similar to tri-linear mipmapping.

Our method with hierarchical density estimation, visibility splatting, and surfel mipmap texture filtering offers more flexible speed-quality tradeoffs than comparable prior art rendering systems.

A major advantage of our surfel rendering is that any kind of synthetic or scanned object can be converted to surfels. For example, we can sample volume data, point clouds, and LDIs of non-synthetic objects. Using an occlusion compatible traversal of the LDC tree, we enable order-independent transparency and true volume rendering. The hardware design of the surfel rendering pipeline is straightforward. Block warping involves only two conditionals for z-buffer tests. We do not need to perform clipping calculations. All frame buffer operations, such as visibility splatting and image reconstruction, can be implemented using standard rasterization and frame buffer techniques. Our rendering pipeline uses no inverse calculations, such as looking up textures from texture maps. Runtime texture filtering becomes simple with our pipeline. There is a high degree of data locality because shape and shade information can be loaded into the pipeline simultaneously with the surfel positional data. Consequently, caching will further improve performance.

Our surfel rendering is ideal for organic models with very high shape and shade complexity. Because we do rasterization and texture filtering in the preprocessing stage, and not in the pipeline, the rendering cost per pixel is dramatically reduced. Rendering performance is essentially determined by warping, shading, and image reconstruction. These operations can easily exploit vectorization, parallelism, and pipelining. Our surfel rendering pipeline offers several speed-quality trade-offs. By decoupling image reconstruction and texture filtering, we achieve much higher image quality than comparable prior art point sample approaches. We introduce visibility splatting, which is very effective at detecting holes and increases image reconstruction performance. Antialiasing with supersampling is naturally integrated in our system. Our pipeline is capable of high image quality at interactive frame rates.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for representing a graphic object in a memory, comprising:

casting rays originating at orthogonal image planes through an object;

sampling shape and shade attributes of the object at points where the rays intersect a surface of the object;

arranging the shape and shade attributes of each sampled point in an octree stored in the memory.

2. The method of claim 1 wherein the shape attributes include positions of the points and an orientation of the surface at the points, the positional attributes being expressed using object space coordinates having image space resolution.

3. The method of claim 1 wherein the shade attributes include texture properties and material properties of the surface at each point.

4. The method of claim 3 wherein the texture properties include color of the surface at each point.

5. The method of claim 4 wherein the texture properties include opacity.

6. The method of claim 1 wherein a size of the octree is reduced.

7. The method of claim 2 wherein the orientation is an index to a quantized normal table.

8. The method of claim 3 wherein the texture for each point is stored in a multi-level texture mipmap.

9. The method of claim 2 wherein x and y coordinates of the points are implicitly defined by the octree, and z coordinates of the points are explicitly stored in the octree.

10. The method of claim 1 wherein the surface includes front and back facing surfaces.

11. The method of claim 1 wherein the texture properties are derived by the steps of:

centering a circular disk at each point in object space, the disk having an orientation tangential to the surface at the point;

mapping each disk to an elliptical disk in texture space;

filtering a texture of the surface using the elliptical disk to obtain a color attribute of the point.

12. The method of claim 11 wherein the filtering uses a Gaussian kernel.

13. The method of claim 11 wherein the elliptical disks overlap.

14. The method of claim 11 wherein a plurality of circular disks are centered and mapped, the plurality of circular disks arranged in increasing sizes to provide a plurality of texture mipmaps.

15. The method of claim 1 wherein higher levels of the octree represent lower resolution attributes of the object, and lower levels of the octree represent higher resolution attributes of the object.

16. The method of claim 15 wherein higher levels of the octree are constructed dyadically by subsampling child nodes at multiples of some power of two, the higher levels representing lower resolution attributes.

17. The method of claim 15 wherein the highest resolution level of the tree has a pixel spacing of h, and a resolution level n as a pixel spacing of $2^n h$.

18. The method of claim 6 wherein the reduction is by a factor of three.

* * * * *